US012791170B2

(12) United States Patent
Konrad et al.

(10) Patent No.: US 12,791,170 B2

(45) Date of Patent: Nov. 10, 2026

(54) HOLDING DEVICE FOR HOLDING A LIGHT SOURCE, LIGHT SOURCE, LIGHTING DEVICE AND METHOD FOR POSITIONING A LIGHT SOURCE

(71) Applicant: LEDVANCE GmbH, Garching bei München (DE)

(72) Inventors: Armin Konrad, Großaitingen (DE); Henrike Streppel, Regensburg (DE); Ralph Hoeck, Friedberg (DE); Shijun Nie, Garching (DE); Zhian Li, Shenzhen Guangdong (CN); Shaoping Chen, Shenzhen Guangdong (CN)

(73) Assignee: LEDVANCE GmbH, Garching bei München (DE)

( * ) Notice: Subject to any disclaimer, the term of this patent is extended or adjusted under 35 U.S.C. 154(b) by 0 days.

(21) Appl. No.: 19/002,885

(22) Filed: Dec. 27, 2024

(65) Prior Publication Data

US 2025/0224098 A1 Jul. 10, 2025

(30) Foreign Application Priority Data

Jan. 10, 2024 (DE) ......................... 102024100610.2

(51) Int. Cl.

| | |
|---|---|
| ***F21V 19/00*** | (2006.01) |
| ***F21Y 103/10*** | (2016.01) |
| ***F21Y 115/10*** | (2016.01) |

(52) U.S. Cl.

CPC ........ *F21V 19/004* (2013.01); *F21V 19/0025* (2013.01); *F21Y 2103/10* (2016.08); *F21Y 2115/10* (2016.08)

(58) Field of Classification Search

CPC ..... F21V 19/0015–004; F21Y 2103/10; F21Y 2115/10

See application file for complete search history.

(56) References Cited

U.S. PATENT DOCUMENTS

| | | | | |
|---|---|---|---|---|
| 7,207,696 B1 * | 4/2007 | Lin | ......................... F21V 19/02 | 362/232 |
| 8,021,192 B2 | 9/2011 | Takata | | |
| 9,923,325 B2 * | 3/2018 | Jansen | .................... F21V 23/06 | |

FOREIGN PATENT DOCUMENTS

| | | | |
|---|---|---|---|
| CN | 107218535 A | | 9/2017 |
| CN | 210241360 U | | 4/2020 |
| JP | 2004055160 A | * | 2/2004 |

* cited by examiner

*Primary Examiner* — Jason M Han

(74) *Attorney, Agent, or Firm* — Hayes Soloway PC

(57) ABSTRACT

A holding device for holding a light source is provided. The holding device comprises a first holding element for holding a first end of the light source, and a second holding element for holding a second end of the light source opposite the first end. The second holding element comprises a movable component for receiving the second end of the light source and a spring mechanism, wherein the spring mechanism is designed to apply a spring force to the movable component so that the light source can be clamped between the first holding element and the second holding element.

20 Claims, 5 Drawing Sheets

HOLDING DEVICE FOR HOLDING A LIGHT SOURCE, LIGHT SOURCE, LIGHTING DEVICE AND METHOD FOR POSITIONING A LIGHT SOURCE

CROSS-REFERENCE TO RELATED APPLICATIONS

This patent application claims the benefit of and priority to German Patent Application No. 10 2024 100 610.2 filed on Jan. 10, 2024, which is herein incorporated by reference in its entirety.

FIELD OF THE DISCLOSURE

The technical field of the present disclosure relates generally to holding devices. In particular, the present disclosure relates to a holding device for holding a light source as well as a light source, a lighting device and a method for positioning a light source.

BACKGROUND

Holding devices for holding light sources in lighting devices are known. In particular, holding devices for holding light sources by screws, adhesives and/or clip connections are known. Some of the known holding devices are inflexible, prone to errors in handling and also difficult to manufacture.

SUMMARY

An object of the present application is to provide a holding device for holding a light source of a lighting device, which enables the user to easily mount and replace the light source, reduce errors during replacement and reduce the logistical effort associated with replacing the light source.

According to a first aspect, a holding device for holding a light source, in particular in a lighting device, is provided. The holding device comprises a, in particular at least one, first holding element for holding a, in particular at least one, first end of the light source and a, in particular at least one, second holding element for holding a, in particular at least one, second end of the light source opposite the first end. The second holding element comprises a movable component for receiving the second end of the light source and a spring mechanism, wherein the spring mechanism is designed to apply a spring force to the movable component so that the light source can be clamped between the first holding element and the second holding element. In particular, the movable component can be designed such that it is pressed onto the second end of the light source so that the first end of the light source can be pressed against the first holding element or into the first holding element.

The first and second holding elements can be designed differently and have different fastening mechanisms. In particular, the first or second holding element can be designed with a holder specially designed for the first end or the second end of the light source. The holder can be equipped with a locking mechanism for securely holding the respective end of the light source. In particular, the holder can have a thermally conductive material so that effective heat dissipation from the light source is made possible.

In particular, the movable component can be designed as part of the second holding element, which is designed to be movable of a housing or a holding frame of the second holding element. The movement can, for example, comprise a translational, rotational or pivoting movement or another type of movement. In particular, the movable component can be designed in such a way as to enable one end of the light source to be accommodated. The movable component can also be designed in such a way that light sources of different sizes and shapes can be accommodated by the holding element. It is also conceivable that the first holding element has a movable component with a suspension for holding one end of the light source.

Spring force is understood to mean a force which is generated by the spring mechanism or by one or more springs of the spring mechanism and with which the movable component of the second holding element is pressed onto the second end of the light source. In particular, the spring force can serve to fix the light source between the first holding element and the second holding element. In particular, the light source can be clamped between the two holding elements by the spring mechanism in such a way that the light source is held in a force-fit manner. This allows the light source to be positioned securely and stably using the holding device.

The holding device facilitates the installation and replacement of light sources in a luminaire. Furthermore, the light source can be positioned more securely through the stabilization with the holding elements, which means that its position is more effectively protected against vibrations or shocks.

The movable component of the second holding element can comprise a spring-loaded slider, which is designed to at least partially form-fitting receive the second end of the light source. In particular, the slider can be designed with a holder for receiving the second end of the light source in a form-fitting manner. A form-fitting receiving is created if, for example, two parts are essentially at least partially connected to each other with an exact fit. The suspension of the slider can be achieved in particular by the spring mechanism of the second holding element. The spring-loaded slider can in particular be a movable component of the second holding element in the holding device, which is designed in such a way that the slider can be moved along a specific path or in a specific direction with the aid of the spring mechanism in order to receive the second end of the light source or to exert the spring force on the second end of the light source. In particular, the spring mechanism in the slider enables the first and second ends of the light source to be clamped between the first and second holding elements. The form-fitting receiving enables a more secure and stable fixation of the second end of the light source, which can therefore be held precisely and accurately. The form-fitting receiving thus contributes to the stability and reliability of the holding device.

The movable component can have a positioning element for positioning a counter-positioning element of the light source. In particular, the positioning element and the counter-positioning element can be designed to at least partially conform to each other. In particular, the positioning element and the counter-positioning element can be designed such that an automatic position correction of the light source can take place when the light source is inserted into the holding device.

The second holding element can comprise a housing for holding the movable component and the spring mechanism. In particular, the housing can be designed to be attached to a carrier element, for example to the light housing, so that the movable component can be moved relative to the carrier element.

The first holding element can be designed to at least accommodate the first part of the light source in a partially form-fitting manner. The form-fitting receiving enables secure and stable fixing of the first end of the light source, which can therefore be held precisely and accurately. The form-fitting receiving thus contributes to the stability and reliability of the holding device. The form-fitting receiving of the first holding element and/or the second holding element can be designed in such a way that different shapes, types and sizes of ends of light sources can be accommodated.

The first holding element can comprise at least one electrical contact element for providing an electrical contact with the light source. By integrating an electrical contact into the first holding element, an electrical connection with the light source can be established without an additional connection. This enables a reliable electrical connection to be established with the light source that is less susceptible to interference. In addition, the electrical connection can be established automatically during installation by receiving the first end of the light source in the first holding element. This not only facilitates the installation of the light source, but also enables easier maintenance, as the light source can be easily removed and replaced without having to disconnect separate electrical connections.

The second holding element can be pivotably mounted so that the second end of the light source can be inserted into the holding device with a simultaneous pivoting movement of the second holding element. The pivotable mounting of the second holding element can simplify the installation of the light source, as the light source can be inserted into the holding device with a single, coordinated movement. An insertion process can include inserting the second end of the light source into the second holding element, tensioning the spring mechanism by pressing the movable component with the second end and inserting the first end of the light source into the first holding element. This enables time saving and precise alignment of the second end of the light source during the insertion process.

The spring mechanism can have an adjustable spring force in order to adjust the clamping force between the second holding element and the second end of the light source. The possibility of adjusting the spring force allows the installation of different light sources with different dimensions and shapes. In particular, the optimum clamping force can be set for the respective shape or nature of the light source in order to hold the light source securely and stably without compressing or damaging it excessively. This contributes to the longevity of the holding device and the light source. Furthermore, the ability to adjust the spring force makes handling easier for the user. In particular, the spring force can be adjusted using a quick-release fastener without additional parts or tools.

According to a second aspect, a light source is proposed. The light source is configured to be held by a holding device according to the first aspect. The light source comprises a first end and a second end opposite the first end. The first end of the light source is configured to be held by the first holding element of the holding device, and the second end of the light source is configured to be held by the second holding element of the holding device such that the light source can be clamped between the first holding element and the second holding element by the spring force of the spring mechanism. The light source can be mounted in a lighting device by the holding device according to the first aspect, wherein the light source can be mounted and/or replaced quickly and conveniently as required.

According to a third aspect, a lighting device is provided. The lighting device comprises a housing and at least one holding device according to the first aspect, which is attached to or in the housing, for holding the at least one light source. The lighting device is characterized by a robust structure and simple mounting of the light source. In addition, light sources can be replaced quickly and easily if necessary.

According to a fourth aspect, a method for positioning a light source is presented. According to the method, a holding device according to the first aspect and a light source having a first end and a second end opposite the first end according to the second aspect are provided. The method comprises inserting the first end of the light source into the first holding element of the holding device. The method further comprises displacing the movable component against the spring force of the spring mechanism, positioning the second end of the light source in the second holding element and releasing the movable component. Due to the spring force, the light source is clamped between the first holding element and the second holding element and thus fixed in position.

Positioning the second end of the light source in the second holding element can include positioning a counter-positioning element of the light source on a positioning element of the second holding element. In particular, the positioning element and the counter-positioning element can be designed in such a way that the an automated position correction of the light source can be enabled when the light source is mounted. The method enables precise positioning of the light source by using the holding device.

In the following description, details are provided to describe the embodiments of the present specification. However, a person skilled in the art will realize that the embodiments can also be carried out without such details.

DETAILED DESCRIPTION

Figure 1:
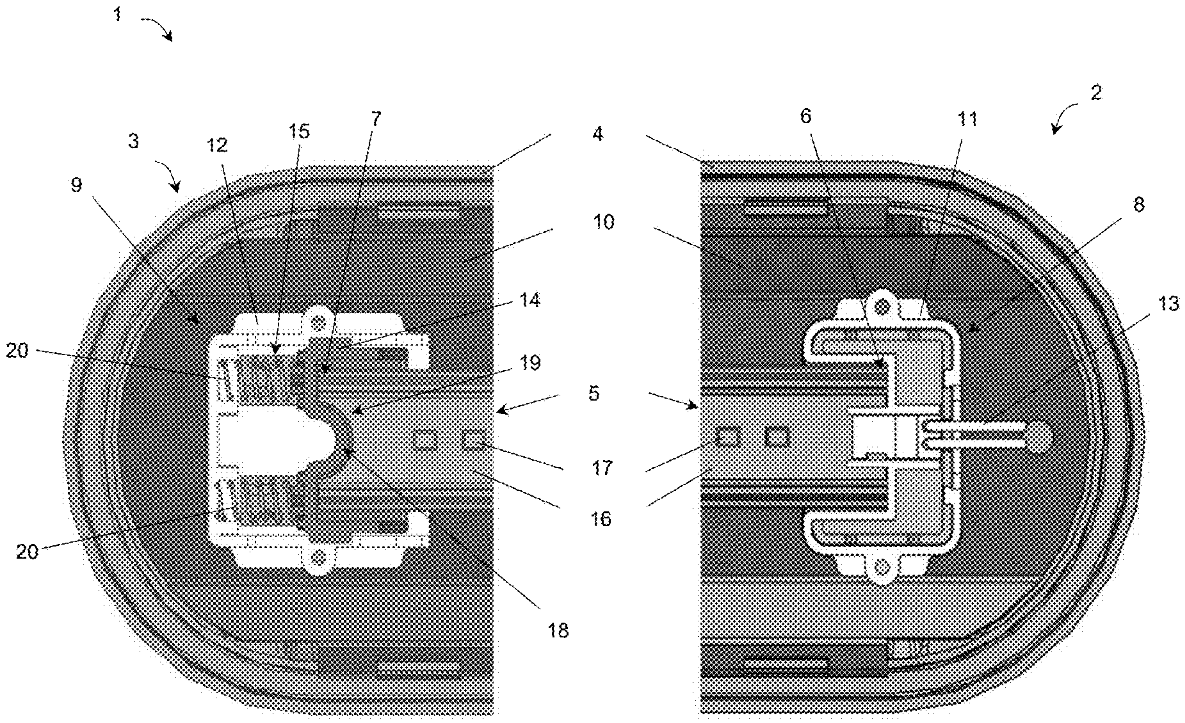
FIG. 1 shows a detailed view of a lighting device in plan view according to an example embodiment.

FIG. 1 shows a detailed view of a lighting device in plan view according to an embodiment example. The lighting device 1 is elongated, wherein only a first end 2 and a second end 3 of the lighting device 1 opposite the first end can be seen in the detailed view in FIG. 1.

The lighting device 1 comprises a housing 4, wherein a light source 5 is accommodated in the housing 4. In the embodiment example shown, the light source 5 also has an elongated shape. The light source 5 comprises a first end 6 and a second end 7 opposite the first end.

The lighting device 1 further comprises a holding device according to an embodiment example. The holding device comprises a first holding element 8 for holding the first end 6 of the light source 5 and a second holding element 9 for holding the second end 7 of the light source 5.

A carrier element 10 for fastening the light source 5 is accommodated in the housing 4 of the lighting device 1, wherein the light source 5 is fastened to the carrier element 10 by the fastening device. In some embodiments, the light source 5 is fastened to a housing wall of the housing 4 of the lighting device 1 by the holding device.

The first holding element 8 comprises a housing 11 or holding frame for fastening the first holding element 8 to the carrier element 10 and the second holding element 9 comprises a housing 12 or holding frame for fastening the second holding element 9 to the carrier element 10.

The first holding element 8 has electrical contact elements 13 for providing electrical contact with the light source 5. In particular, the first holding element 8 can be designed such that electrical contact is automatically established between the light source 5 and the contact elements 13 when the first end 6 of the light source 5 is inserted into the first holding element 8.

The second holding element 9 comprises a movable component 14 and a spring mechanism 15. The movable component 14 is designed to hold the second end 7 of the light source 5.

In the embodiment example shown, the light source 5 is designed as an LED light source or LED module and has a number of LEDs 17 mounted on a carrier board 16.

The movable component 14 of the second holding element 9 is designed by the spring mechanism 15 in the form of a spring-load slider 21, wherein the second end 7 of the light source 5 is received in a form-fitting manner in the movable component 14. In particular, the movable component 14 has a positioning element 18 in the form of a protrusion and the second end 7 of the light source 5 has, conforming to the positioning element 18, a counter-positioning element 19 in the form of an indentation for receiving the positioning element 18 of the movable component 14.

The spring mechanism 15 comprises two parallel springs 20 or compression springs, which are clamped between the housing 12 of the second holding element 9 and the movable component 14. The springs 20 are aligned parallel to a connecting line between the first holding element 8 and the second holding element 9, so that they can act on the movable component 14 with a spring force directed towards the first holding element 8.

Figure 2:
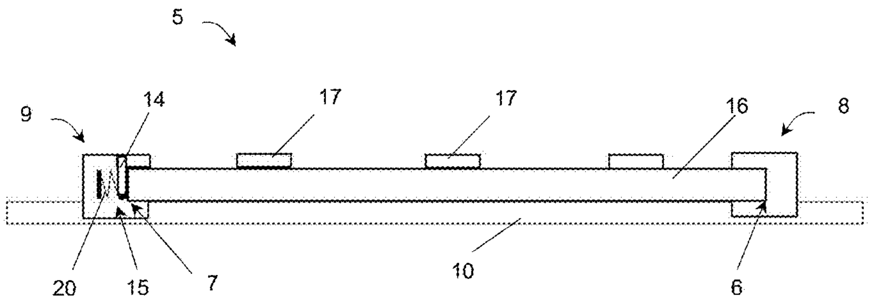
FIG. 2 shows a schematic cross-section of a light source in the mounted state according to an example embodiment.

FIG. 2 shows a schematic cross-section of a light source in the fixed state according to an embodiment example. In the schematic cross-section of FIG. 2, the light source 5, the holding device and the carrier element 10 can be seen, on which the light source 5 is held by the first holding element 8 and the second holding element 9 of the holding device. In addition, the spring mechanism 15 with a compression spring 20 can be seen, which is clamped between the housing 12 of the second holding element 9 and the movable component 14.

The function of the spring mechanism 15 is clearly recognizable from the schematic cross-section in FIG. 2. When the light source 5 is inserted into the holding device, the movable component 14 is pressed outwards against the spring force of the spring mechanism 15. After inserting and releasing the light source 5, the compression springs 20 of the spring mechanism 15 attempt to return to their original position. The compression springs 20 press on the movable component 14 with a spring force, which is transmitted from the movable component 14 to the second end 7 of the light source 5. The spring force can be transmitted from the second end 7 of the light source 5 via the light source body to the first end 6 of the light source 5, so that the first end 6 can be pressed against the first holding element 8 or into the first holding element 8.

Figure 3:
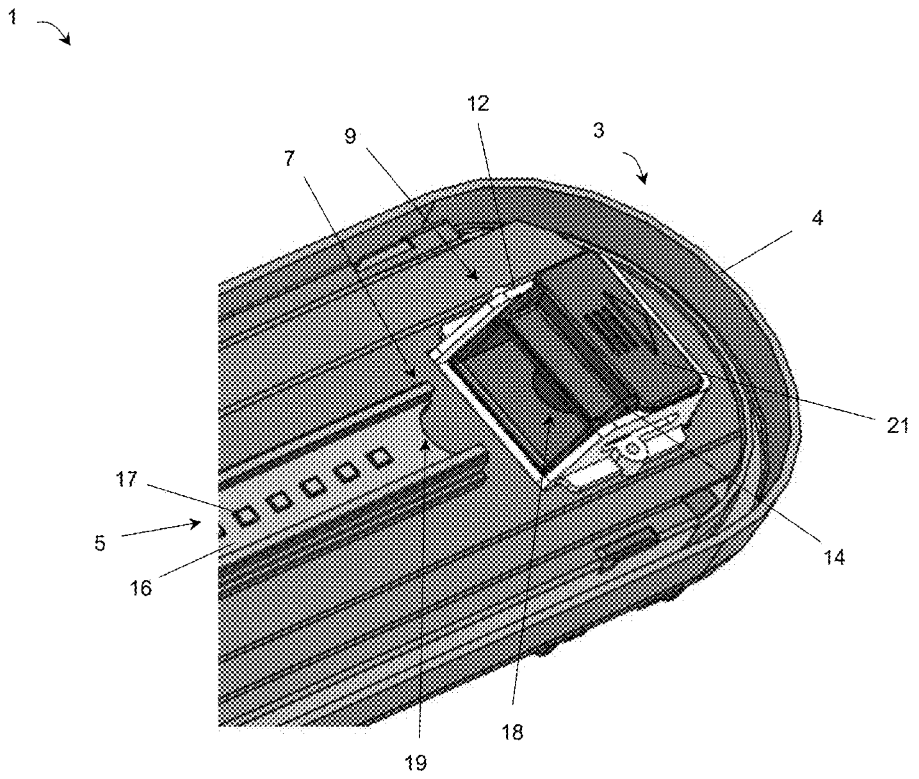
FIG. 3 shows a first perspective detail view of a lighting device according to an example embodiment.

FIG. 3 shows a first perspective detail view of a lighting device 1 according to an embodiment example. In the detailed view of FIG. 3, the second end 3 of the lighting device 1, the second end 7 of the light source 5 and the second holding element 9 can be seen. The second end 7 of the light source 5 is located outside the second holding element 9. The position of the light source 5 shown can arise in particular shortly after the light source 5 has been removed or shortly before the light source 5 is inserted into the holding devices.

In the perspective view of FIG. 3, the cylindrical surface of the positioning element 18 or the protrusion of the movable component 14 and the counter-positioning element 19 or the semicircular recess at the second end 7 of the light source 5 can be clearly seen.

Furthermore, a slider 21 with an outward-facing arrow for manual actuation is visible in FIG. 3. The slider 21 is mechanically connected to the movable component 14, so that a displacement of the slider 21 in the direction of the arrow causes a displacement of the movable component 14 against the spring force of the spring mechanism 15 (not visible in FIG. 3).

By actuating the slider 21, the spring mechanism 15 can thus be tensioned so that the light source 5 can be easily inserted into the holding device.

Figure 4:
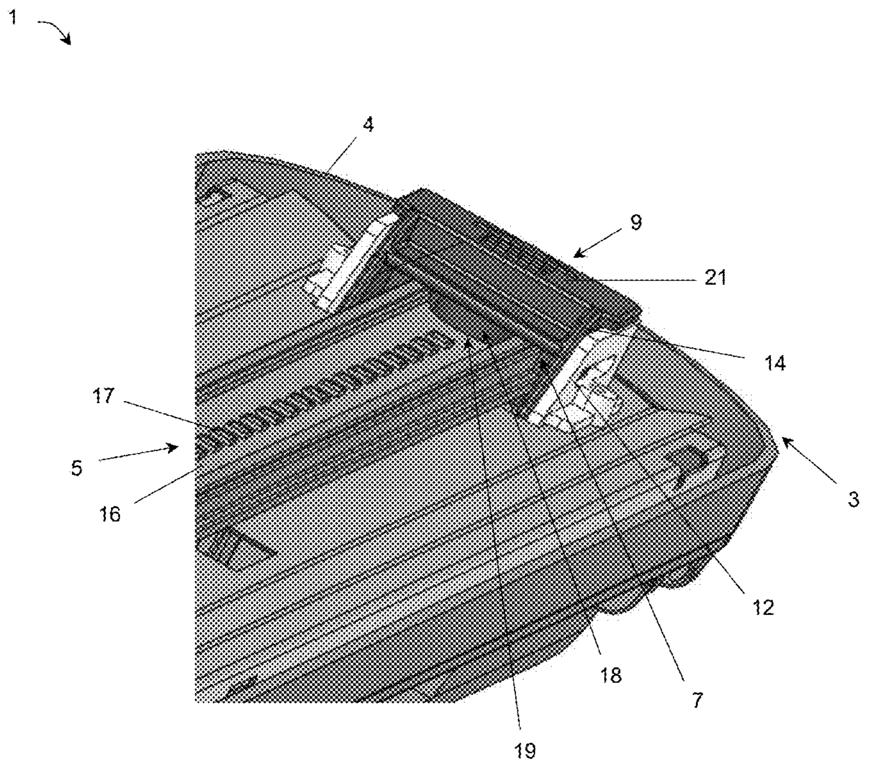
FIG. 4 shows a second perspective detail view of the lighting device according to FIG. 3.

FIG. 4 shows a second detailed perspective view of the lighting device 1 according to FIG. 3. In FIG. 4, the light source 5 is shown in the mounted state. In the mounted state, the second end 7 of the light source 5 is located in the second holding element 9. Due to the counter-positioning element 19 and the positioning element 18, a form-fitting connection is formed between the second end 7 and the movable component 14, whereby a particularly stable mounting of the light source 5 can be realized.

Figure 5:
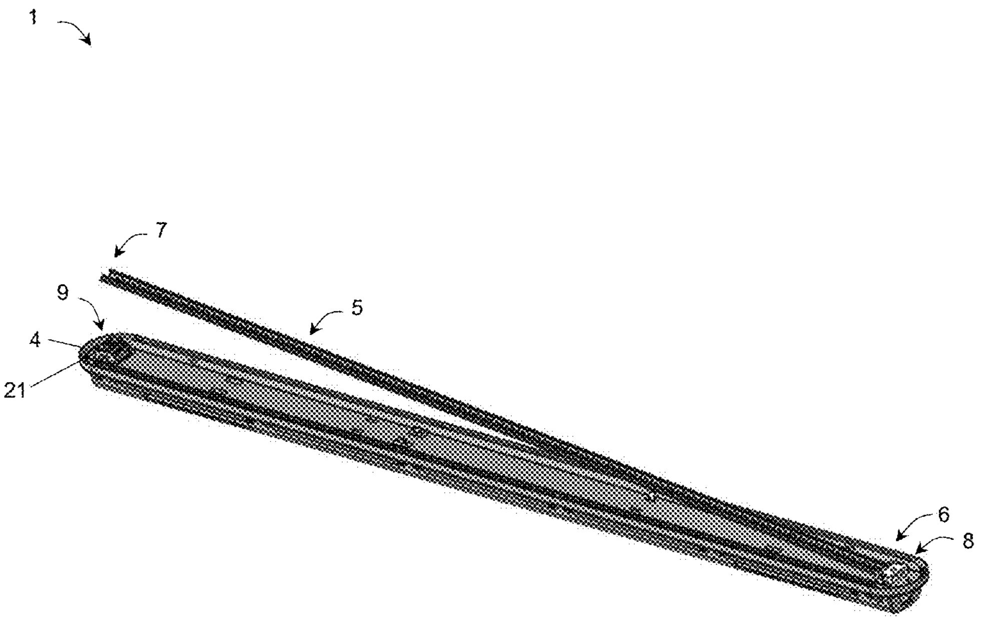
FIG. 5 shows a perspective view of the lighting device according to FIGS. 3 and 4.

FIG. 5 shows a perspective view of the lighting device 1 according to FIGS. 4 and 5. In the view of FIG. 5, the light source 5 is shown in a partially assembled state, in particular to illustrate the assembly process of the light source 5. In the state shown in FIG. 5, the first end 6 of the light source 5 is located in the first holding element 8 and the second end 7 of the light source 5 is located outside the second holding element 9. From this position, the light source 5 can be easily inserted into the holding device by first manually pushing the slider 21 or the movable component 14 outwards in order to clear the way for the insertion of the second end 7 of the light source 5. The light source 5 can then be positioned between the first holding element 8 and the second holding element 9 and the slider 21 can be released. The spring mechanism 15 ensures that the light source 5 is clamped between the first holding element 8 and the second holding element 9 and fixed in position.

In some embodiments, at least one retaining element has at least the following three functional parts: a housing, a movable component 14, and at least one spring 20. The movable component has a receiving space or cavity for receiving one of the ends of the light source 5. In particular, the cavity can be designed to restrict the freedom of movement of an end of the light source 5 accommodated therein, in particular in the transverse direction. In particular, the movable component 14 can be designed in such a way that the light source 5 can only move when the movable component 14 moves.

To mount the holding device, both holding elements can be mounted on a luminaire in the correct position so that they match the dimensions of the light source 5.

To insert the light source 5, first the holding span width of the two holding devices by pushing the movable component 14 outwards can be increased. Once the light source 5 has been inserted into the holding device, the movable component 14 or the slider 21 can be released. The movable component 14 then moves towards the original position and automatically locks the light source 5 in the end position.

The holding device thus provides a mechanical positioning system for fixing the two ends of the light source 5. Due to the mobility of the movable component 14, the distance between the holders of the two ends can be varied. Once the light source 5 has been inserted, the movable component 14 of the second holding element 9 grips one end of the light source 5 and pushes it into the correct position. The light source 5 is automatically locked by the first holding element 8 and the second holding element 9. No tools are required to replace the light source 5, which means that the light source 5 can be installed or replaced in a particularly convenient and simple manner. The protrusion of the movable component 14 acts as a positioning element 18 to precisely position the light source 5 by the indentation or counter-positioning element 19. In this way, the shape or the wall of the movable component 14 can be utilized for automatic positioning of the light source 5.

The geometry of the protrusion or the positioning element 18 of the movable component 14 and the counter-positioning element 19 can vary depending on the embodiment example. For example, instead of a cylindrical geometry or semicircular geometry, disc-shaped, triangular or other geometries of the positioning element 18 or the counter-positioning element 19 can be used to position the light source 5.

Although at least one exemplary embodiment has been shown in the foregoing description, various changes and modifications may be made. Said embodiments are merely examples and are not intended to limit the scope, applicability or configuration of the present disclosure in any way. Rather, the foregoing description provides the skilled person with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be combined with each other in order to obtain further functions.

LIST OF REFERENCE SYMBOLS

1 lighting device
2 first end of the lighting device
3 second end of the lighting device
4 housing of the lighting device
5 light source
6 first end of the light source
7 second end of the light source
8 first holding element
9 second holding element
10 carrier element
11 housing of the first holding element
12 housing of the second holding element
13 contact element
14 movable component
15 spring mechanism
16 carrier board
17 LED
18 positioning element
19 counter-positioning element
20 spring
21 slider

What is claimed is:

1. A holding device configured for holding a light source, the holding device comprising:
- a first holding element configured for holding therein a first end of the light source; and
- a second holding element configured for holding therein a second end of the light source opposite the first end, the second holding element comprising:
  - a translationally movable component configured for receiving the second end of the light source; and
  - a spring mechanism configured to apply a spring force to the translationally movable component so that the light source is clampable between the first holding element and the second holding element;
- wherein the second holding element is pivotably mounted so that the second end of the light source is insertable into the holding device with a simultaneous pivoting movement of the second holding element.

2. The holding device according to claim 1, wherein the translationally movable component comprises a positioning element configured for positioning a counter-positioning element of the light source.

3. The holding device according to claim 2, wherein:
- the positioning element comprises a protrusion; and
- the counter-positioning element comprises an indentation configured to physically interface with the protrusion.

4. The holding device according to claim 1, wherein the second holding element further comprises a housing configured for receiving the translationally movable component and the spring mechanism.

5. The holding device according to claim 1, wherein in being configured for holding the first end of the light source, the first holding element is configured to receive the first end of the light source in a form-fitting manner.

6. The holding device according to claim 1, wherein the first holding element comprises at least one electrical contact element configured for providing an electrical contact with the light source.

7. The holding device according to claim 6, wherein the second holding element is devoid of any electrical contact element like that of the first holding element.

8. A light source configured to be held by the holding device according to claim 1.

9. A lighting device comprising the holding device according to claim 1.

10. The lighting device according to claim 9, further comprising a housing, wherein the holding device is attached to the housing.

11. The lighting device according to claim 10, further comprising a carrier element attached to the housing, wherein at least one of the first holding element and the second holding element is attached to the carrier element.

12. A method comprising:
- providing the holding device according to claim 1;
- inserting the first end of the light source into the first holding element;
- moving the translationally movable component against the spring force of the spring mechanism;
- positioning the second end of the light source in the second holding element; and
- releasing the translationally movable component.

13. The method according to claim 12, wherein positioning the second end of the light source in the second holding element comprises:

positioning a counter-positioning element of the light source to a positioning element of the second holding element.

14. The holding device according to claim 1, further comprising a slider operatively connected to the translationally movable component and configured such that displacement of the slider causes displacement of the translationally movable component against the spring force.

15. The holding device according to claim 1, wherein:

the first end of the light source comprises a first end of a carrier board; and the second end of the light source comprises a second end of the carrier board.

16. The holding device according to claim 15, wherein:

the carrier board comprises a circuit board; and the light source further comprises at least one light-emitting diode (LED) populated on the circuit board.

17. The holding device according to claim 1, wherein the first holding element and the second holding element are affixed to a carrier element external to the holding device.

18. The holding device according to claim 1, wherein the first holding element is devoid of any spring mechanism like that of the second holding element.

19. The holding device according to claim 1, wherein the spring mechanism is configured to apply the spring force to the translationally movable component so as to press the light source against the first holding element.

20. The holding device according to claim 1, wherein the spring mechanism is configured to apply the spring force to the translationally movable component so that the translationally movable component in turn applies force to an edge of the light source directed towards the first holding element.

* * * * *